(12) United States Patent
Välimäki et al.

(10) Patent No.: US 11,288,027 B1
(45) Date of Patent: Mar. 29, 2022

(54) PERIPHERAL DISPLAY APPARATUS AND SYSTEM

(71) Applicant: Varjo Technologies Oy, Helsinki (FI)

(72) Inventors: Juha Välimäki, Vantaa (FI); Niko Eiden, Espoo (FI); Qing Xu, Espoo (FI); Klaus Melakari, Oulu (FI); Oiva Arvo Oskari Sahlsten, Salo (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/230,096

(22) Filed: Apr. 14, 2021

(51) Int. Cl.
*G06F 3/14* (2006.01)
*G06F 3/01* (2006.01)
*G09G 3/00* (2006.01)
*G06F 1/16* (2006.01)
*H04N 5/247* (2006.01)

(52) U.S. Cl.
CPC ............ *G06F 3/1423* (2013.01); *G06F 1/163* (2013.01); *G06F 3/013* (2013.01); *G09G 3/003* (2013.01); *H04N 5/247* (2013.01); *G09G 2370/00* (2013.01)

(58) Field of Classification Search
CPC ......... G06F 3/14; G06F 3/0488; H04L 29/06; H04N 7/17
See application file for complete search history.

(56) References Cited

U.S. PATENT DOCUMENTS

| | | | | |
|---|---|---|---|---|
| 2013/0278631 | A1* | 10/2013 | Border | G02C 5/143 345/633 |
| 2016/0048211 | A1* | 2/2016 | Raffle | G06F 3/013 715/863 |
| 2016/0313956 | A1* | 10/2016 | Fuchikami | G06F 3/14 |
| 2017/0053450 | A1* | 2/2017 | Rodriguez | H04N 13/344 |

* cited by examiner

*Primary Examiner* — Shaheda A Abdin
(74) *Attorney, Agent, or Firm* — Ziegler IP Law Group, LLC

(57) ABSTRACT

A peripheral display apparatus that is wearable by a user. The peripheral display apparatus includes at least two light sources and at least one processor coupled to at least two light sources. The at least two light sources include a first light source and a second light source arranged at a first peripheral portion and a second peripheral portion of a field of view of user, respectively, first peripheral portion and second peripheral portion being positioned at opposite horizontal ends of field of view. The at least one processor or at least one external processor communicably coupled to at least one processor is configured to generate at least two images including a first image and a second image, wherein at least one processor is configured to display first image and second image simultaneously at first light source and second light source, respectively.

19 Claims, 6 Drawing Sheets

PERIPHERAL DISPLAY APPARATUS AND SYSTEM

TECHNICAL FIELD

The present disclosure relates to display apparatuses. Furthermore, the present disclosure also relates to peripheral display apparatuses that are wearable by users. Moreover, the present disclosure also relates to peripheral display systems comprising such peripheral display apparatuses and primary display apparatuses.

BACKGROUND

Human vision enables experiencing the observable world. Human vision is associated with a field of view, i.e., extent of the observable world that is observed at any given moment, while gazing at a point. Notably, the human vision is very wide, defined by over 210 degree horizontal and around 150 degree vertical field of view that includes peripheral vision also. The peripheral vision is an area at a periphery of the field of view. It will be appreciated that a vast majority of area in the field of view is included in the peripheral vision.

Some conventional extended-reality devices provide the same image resolution throughout the field of view and thus are expensive due the increase in the computational cost of achieving higher image resolutions. Other conventional extended-reality devices are known to provide a spatially-variable image resolution across the field of view. All of these conventional devices are limited to certain sizes of displays employed therein, and thus provide only a limited field of view, beyond which a user sees a dark boundary. Thus, such extended-reality devices fail to effectively cover the human peripheral vision.

Therefore, in light of the foregoing discussion, there exists a need to overcome the aforementioned drawbacks.

SUMMARY

The present disclosure seeks to provide a peripheral display apparatus. The present disclosure also seeks to provide a peripheral display system. An aim of the present disclosure is to provide a solution that overcomes at least partially the problems encountered in prior art.

In one aspect, an embodiment of the present disclosure provides a peripheral display apparatus that is wearable by a user, comprising:

at least two light sources comprising a first light source and a second light source arranged at a first peripheral portion and a second peripheral portion of a field of view of the user, respectively, the first peripheral portion and the second peripheral portion being positioned at opposite horizontal ends of the field of view; and at least one processor coupled to the at least two light sources, wherein the at least one processor or at least one external processor communicably coupled to the at least one processor is configured to generate at least two images comprising a first image and a second image, wherein the at least one processor is configured to display the first image and the second image simultaneously at the first light source and the second light source, respectively.

In yet another aspect, an embodiment of the present disclosure provides a peripheral display system comprising:

a primary display apparatus comprising at least one light source that is to be employed to display at least one image at a central portion of a field of view of a user; and a peripheral display apparatus that is wearable by the user, comprising:

at least two light sources comprising a first light source and a second light source arranged at a first peripheral portion and a second peripheral portion of the field of view of the user, respectively, the first peripheral portion and the second peripheral portion being positioned at opposite horizontal ends of the field of view; and at least one processor coupled to the at least two light sources, wherein the at least one processor or at least one external processor communicably coupled to the at least one processor is configured to generate at least two images comprising a first image and a second image, wherein the at least one processor is configured to display the first image and the second image simultaneously at the first light source and the second light source, respectively.

Embodiments of the present disclosure substantially eliminate or at least partially address the aforementioned problems in the prior art, and facilitate a peripheral view with stimulus tailored to purpose, such as for example in simulators, professional gaming and immersive entertainment. Beneficially, the peripheral view is enough to be facilitated at low image resolutions, and thus, is cost-effective, while enhancing user's immersiveness.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
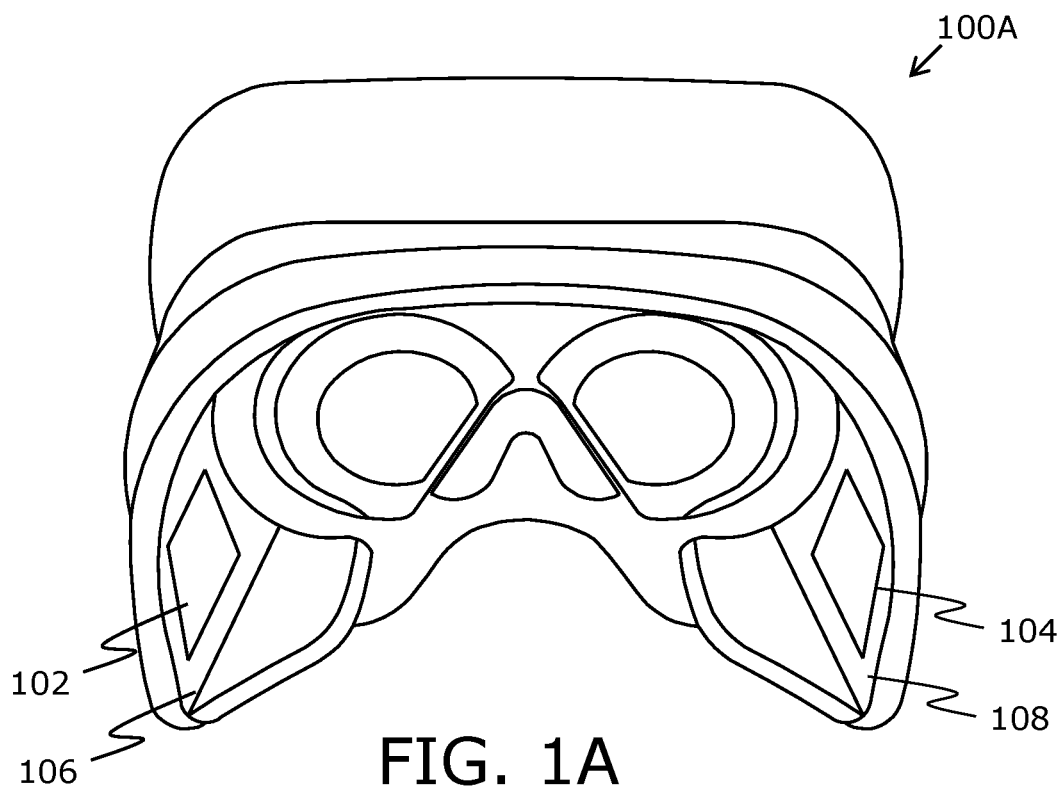
FIGS. 1A, 1B and 1C are schematic illustration of peripheral display apparatuses, in accordance with various embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a peripheral display apparatus that is wearable by a user, comprising:
- at least two light sources comprising a first light source and a second light source arranged at a first peripheral portion and a second peripheral portion of a field of view of the user, respectively, the first peripheral portion and the second peripheral portion being positioned at opposite horizontal ends of the field of view; and
- at least one processor coupled to the at least two light sources, wherein the at least one processor or at least one external processor communicably coupled to the at least one processor is configured to generate at least two images comprising a first image and a second image, wherein the at least one processor is configured to display the first image and the second image simultaneously at the first light source and the second light source, respectively.

In yet another aspect, an embodiment of the present disclosure provides a peripheral display system comprising:
- a primary display apparatus comprising at least one light source that is to be employed to display at least one image at a central portion of a field of view of a user; and
- a peripheral display apparatus that is wearable by the user, comprising:
- at least two light sources comprising a first light source and a second light source arranged at a first peripheral portion and a second peripheral portion of the field of view of the user, respectively, the first peripheral portion and the second peripheral portion being positioned at opposite horizontal ends of the field of view; and
- at least one processor coupled to the at least two light sources, wherein the at least one processor or at least one external processor communicably coupled to the at least one processor is configured to generate at least two images comprising a first image and a second image, wherein the at least one processor is configured to display the first image and the second image simultaneously at the first light source and the second light source, respectively.

The present disclosure provides the aforesaid peripheral display apparatus that is wearable by the user, and the aforesaid peripheral display system. The peripheral display apparatus facilitates a peripheral view for use in, for example, simulators, professional gaming and immersive entertainment. The peripheral display apparatus is utilised to supplement a primary display apparatus, thereby providing a wide horizontal field of view (covering both left and right sides), for example, as high as 220 degree with a relatively low resolution at the peripheral portions as compared to the central portion of the field of view. As the user is provided with just enough image details in the peripheral portions, the peripheral display apparatus and system appear to mimic the human peripheral vision. Moreover, the peripheral view is provided simultaneously with a central view without requiring the user of the aforesaid peripheral display apparatus to rotate her/his eyes or turn her/his head. Pursuant to embodiments, the peripheral view is facilitated to apparently mimic the human peripheral vision and thus, can be provided at low image resolutions, thereby being cost-effective, while enhancing user's immersiveness.

The peripheral display apparatus and system provide the user with more information associated with content being viewed. Pursuant to embodiments, the at least two images present the peripheral view of a given real-world environment or a given extended-reality environment, which is missing and/or obliterated from the central view.

Throughout the present disclosure, the term "display apparatus" as used herein refers to a specialized equipment that is configured to display an image to a user of the said apparatus, when in use. It will be appreciated that the display apparatus may not necessarily provide a field of view that is exactly perpendicular (namely, straight ahead) but the field of view could be tilted in order to provide a wide stereo overlap area for binocular human vision. In this regard, the display apparatus comprises rendering a central view of a given environment (implemented as an image of objects in a real-world or extended reality (XR) environment) and/or rendering a peripheral (side or outside of line of sight) view of the given environment to a display thereof.

Specifically, the "peripheral display apparatus" relates to a specialized equipment that is configured to display the peripheral view of the image that is outside of the central view of the displayed environment. The peripheral view comprises at least a left-hand side view and a right-hand side view. The peripheral view may comprise at least one of: a top side view, a bottom side view. While in operation, the peripheral display apparatus is placed in a close proximity of the eyes of the user. Wearing the peripheral display apparatus, directly over eyes or over the head enable a hands-free and hassle-free user experience. Optionally, the peripheral display apparatus that is wearable by the user includes, but is not limited to, head mounted devices (or headset), spectacles, eyeglasses.

The peripheral display system could be implemented as an extended reality (XR) headset, a pair of XR glasses, a head-mounted virtual reality (VR) device, a pair of virtual reality glasses, an augmented reality (AR) headset, and the like, that is configured to present a visual scene of an environment, such as for example a real-world environment or any of AR, VR, mixed reality (MR) or XR environments, to the user. The term "extended-reality" encompasses VR, AR, MR, and the like. Therefore, the peripheral display apparatus, that covers the peripheral portions of the field of view, could be worn by the user, for example, while watching movies on a big screen, while flying in simulators, while playing games on gaming consoles, and so forth. It will be appreciated that the peripheral display apparatus and system enable displaying both the central view and the peripheral view simultaneously to the user for a holistic view of the environment.

Furthermore, the term "light source" as used herein refers to an element that is to be employed to display the images to the user. The terms "first peripheral portion" and "second peripheral portion" relate to portions of the field of view that lie at the periphery of the field of view, namely outside the central view. More specifically, the first peripheral portion and the second peripheral portion are configured to ergonomically cover a left periphery and a right periphery of the field of view of the user.

Optionally, the at least two light sources are implemented as at least two displays. In this regard, the at least two images are displayed at the at least two displays. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the at least two light sources are implemented as at least two projectors. In this regard, the at least two images are projected onto a projection screen or directly onto a retina of the user's eyes. Examples of the such a projector include, but are not limited to, an LCD-based projector, an LED-based projector, an OLED-based projector, an LCoS-based projector, a Digital Light Processing (DLP)-based projector, and a laser projector. Yet alternatively, optionally, the at least two light sources are implemented as an arrangement of illuminators. As an example, the arrangement of illuminators may be implemented as a cloud of LEDs, a grid-like arrangement of LEDs or an irregular matrix of LEDs. The illuminators, in operation, emit light of a visible wavelength. Examples of such an illuminator include, but are not limited to, a light-emitting diode, a laser.

It will be appreciated that the first light source and the second light source are to be employed to display a first image and a second image to a first eye and a second eye of the user, respectively. In this regard, the at least two light sources are used to display separate peripheral images, such as the first image and the second image, to the left and right eyes of the user. In this regard, one of the at least two light sources is arranged to be used for a left eye of a user, and one of the at least two light sources is arranged to be used for a right eye of the user. The at least two light sources allow for separate optimization of optical paths of the first image and the second image (for example, towards the left eye and the right eye of the user).

The first light source and the second light source could be circular, elliptical, parabolic, hyperbolic, spherical, aspherical, concave, convex, planar, aplanar, polygonal or freeform in shape. The at least two light sources could be similar or dissimilar in shape.

The first light source and the second light source could be planar or curved in shape. Optionally, the first light source and the second light source are inwardly curved in shape. It will be appreciated that the shape of the first light source and the second light source plays an important role in convergence of the light emitting therethrough. Beneficially, the inwardly curved shape of the first light source and the second light source reduces distortion effects (for example, such as geometric distortion) and provides an 'immersive' experience, while facilitating a wider field of view to the user. It will be appreciated that the shape of the light sources plays an important role in how distortions change when eyes rotate or when eyes are not placed in an ideal position with respect to the light sources. Additionally, the inwardly curved shape provides satisfactory viewing angle, efficient image quality (by reducing outer edge distortions), and minimized glare from ambient light. Optionally, the inwardly-curved shape of the first light source and the second light source is achieved by employing a single curved light source, or a plurality of planar light sources arranged in an array.

Optionally, the first light source and the second light source extend vertically. The vertically-extended design of the first light source and the second light source enables covering a wider vertical field of view. As an example, the first light source might display a portion of the field of view that extends almost from top to bottom vertically on the left side of the left eye, whereas the second light source might display a portion of the field of view that extends almost from top to bottom vertically on the right side of the right eye. This increases a vertical angle of the field of view for the peripheral vision of the user. Notably, the vertical field of view of the peripheral display apparatus could be close to 180 degrees, due to the vertically extended first light source and the second light source.

Optionally, the first light source and the second light source are positioned at a first angle and a second angle with respect to a plane that is perpendicular to a forward line of vision of the user, wherein the first angle and the second angle lie in a range of 30-100 degrees. The terms "first angle" and "second angle" as used herein refer to placement angles of arranging the first light source and the second light source at the first peripheral portion and the second peripheral portion of the field of view. The first angle and the second angle may be from 30, 45, 60 or 75 degrees up to 45, 60, 75, 90 or 100 degrees. In an example, the first angle and the second angle are 90 degrees. In such case, the first light source and the second light source are arranged parallel to and facing each other. In another example, the first angle and the second angle are 60 degrees. In such case, the first light source and the second light source are arranged in a manner that a front end of the first light source and the second light source is aligned closer to the eye while a rear end of the first light source and the second light source is aligned relatively away from the eye, to form a 'narrow' V-shape when observed from the plane that is perpendicular to the forward line of vision of the user. In yet another example, the first angle and the second angle are 30 degrees. In such case, the first light source and the second light source are arranged in a manner that a front end of the first light source and the second light source is aligned closer to the eye while a rear end of the first light source and the second light source is aligned far away from the eye, to form a 'broad' V-shape when observed from the plane that is perpendicular to the forward line of vision of the user.

Moreover, the first angle and the second angle may be the same resulting in the two peripheral displays to be arranged symmetrically. Alternatively, the first angle and the second angle may be different resulting in an asymmetric arrangement of the two peripheral displays. Optionally, the peripheral display apparatus may be provided with actuators for adjusting the first angle and the second angle based on a user requirement and comfort.

Optionally, a central portion of the field of view of the user spans between 0 degrees and an angle that lies in a range of 30-75 degrees with respect to the forward line of vision of the user, and the first peripheral portion and the second peripheral portion of the field of view span between an angle that lies in a range of 30-75 degrees and an angle that lies in a range of 90-130 degrees with respect to the forward line of vision. It will be appreciated that the central view (namely, the central portion of the field of view) and the peripheral view of a given environment (real-world or XR) or image collectively constitute the visual scene upon combination of projections thereof. Notably, the human vision forms a conical field of view. The above ranges provide an angular size (namely, an angular extent) of the central view and the peripheral view presented to the user. Notably, the angular size is measured with respect to the user's eyes or an imaginary point from where the user would apparently view the visual scene. The angular size of the central portion of the field of view may span from 60, 70, 80, 90, 100, 110, 120 degrees up to 70, 80, 90, 100, 110, 120, 130, 140 or 150 degrees.

The aforesaid central portion and the aforesaid peripheral portions of the field of view collectively constitute the total field of view of the user. Thus, the horizontal field of view of the peripheral display apparatus could be in a range of 180-260 degrees with respect to the forward line of vision of the user.

Furthermore, throughout the present disclosure, the term "processor" refers to hardware, software, firmware or a combination of these. The at least one processor of the peripheral display apparatus controls operation of the at least two light sources and other components associated with the peripheral display apparatus. It will be appreciated that the term "at least one processor" refers to "one processor" in some implementations, and "a plurality of processors" in other implementations. Moreover, each of the at least one processor is individually coupled to each of the at least two light sources. For example, for two light sources, the peripheral display apparatus could comprise two processors, wherein each of the two processors is individually coupled to a corresponding light source. Moreover, the at least one external processor could be implemented via an external computing device that is coupled in communication with the peripheral display apparatus.

Optionally, the peripheral display apparatus further comprises at least two cameras comprising a first camera and a second camera arranged to capture a first input image and a second input image of a first region and a second region of a real-world environment in which the user is present, respectively, wherein the at least one processor or the at least one external processor is configured to generate the first image and the second image based on the first input image and the second input image, respectively. The first camera and the second camera are respectively arranged to cover at least the first peripheral portion and the second peripheral portion of the field of view. The first input image and the second input image are provided as camera feed for further processing and generation of the aforesaid first image and the aforesaid second image, respectively. The at least two cameras are communicably coupled with the at least one processor or the at least one external processor.

Moreover, when generating the at least two images, the at least one processor or the at least one external processor is configured to process the first input image and the second input image by identifying at least a first object and a second object present in the real-world environment corresponding to the first peripheral portion and the second peripheral portion of the field of view, respectively, and matching at least the first object and the second object with objects visible at a periphery of the at least one image presented by the primary display apparatus. Optionally, the at least one processor or at least one external processor is configured to generate image data for the at least two images in a manner that the missing and/or obliterated parts of the given real-world environment are filled in. Optionally, when generating the image data, the at least one processor or at least one external processor is configured to employ at least one of: an inpainting algorithm, an image conservation algorithm, an image reconstruction algorithm, a computer vision algorithm, an artificial intelligence algorithm.

The term "image data" refers to data pertaining to visual information of a given image, which encompasses not only colour information represented in the given image, but also other attributes associated with the given image (for example, such as depth information, transparency information, and the like). Optionally, in this regard, the at least one processor or the at least one external processor is configured to determine an optical depth and a location of a part or whole of the first object and the second object, and generate the at least two images based on the determined optical depth and the location.

Optionally, when generating image data for a given image, the at least one processor or the at least one external processor is configured to utilize a portion of the central view neighbouring a corresponding peripheral view. Optionally, in this regard, the image data for the given image is generated based on image data of said portion of the central view. It will be appreciated that the image data of the portion of the central view is already known to the at least one processor or the at least one external processor. As an example, pixel values of pixels corresponding to the given image are determined from pixel values of neighbouring pixels of the portion of the central view. Optionally, the neighbouring pixels of the portion of the central view are utilized to make the given peripheral view of the given image appear seamless and continuous with the central view of the given image. Therefore, when a user views the given image along with the central view, the user experiences realism and immersiveness within the displayed environment.

Optionally, the at least two light sources further comprise at least one third light source and at least one fourth light source arranged at a third peripheral portion and a fourth peripheral portion of the field of view of the user, respectively, the third peripheral portion and the fourth peripheral portion being positioned at opposite vertical ends of the field of view. As mentioned above, the first light source and the second light source are arranged to augment the horizontal field of view of the user. It will be appreciated that the at least one third light source and the at least one fourth light source, that are structurally and functionally similar to the first light source and the second light source, are arranged at opposite vertical ends, i.e., the third peripheral portion and the fourth peripheral portion, of the field of view, respectively, to augment the vertical field of view of the given image. The opposite vertical ends, i.e., the third peripheral portion and the fourth peripheral portion, relate to a top side and a bottom side of the peripheral display apparatus. The at least one third light source and the at least one fourth light source facilitate a wider vertical field of view to the user. It will be appreciated that each of the at least one third light source and the at least one fourth light source are provided for both the right and the left eyes of the user. In an example, the at least one third light source could comprise two light sources one for each of the right and left eyes. Similarly, the at least one fourth light source could comprise two light sources one for each of the right and left eyes.

Optionally, the at least one third light source and the at least one fourth light source are positioned at a third angle and a fourth angle with respect to a plane that is perpendicular to the forward line of vision of the user, and wherein the third angle and the fourth angle lie in a range of 30-100 degrees. Similar to the first and second angles corresponding to the first and second light sources, the third angle and the fourth angle may range from 30, 45, 60 or 75 degrees up to 45, 60, 75, 90 or 100 degrees.

Moreover, the at least two images further comprise at least one third image and at least one fourth image, and wherein the at least one processor is configured to display the at least one third image and the at least one fourth image at the at least one third light source and the at least one fourth light source, respectively, simultaneously with the display of the first image and the second image at the first light source and the second light source. This creates a real and immersive user experience without affecting the perceived image quality.

In an embodiment, the at least two light sources further comprise at least one fifth light source arranged at the central portion of the field of view of the user. In this regard, the at least two images further comprise at least one fifth image, wherein the at least one processor is configured to display the at least one fifth image at the at least one fifth light source, simultaneously with the display of the first image and the second image at the first light source and the second light source. Throughout the present disclosure, the term "central portion" refers to a portion of the field of view that lies between the peripheral portions of the field of view. Optionally, the at least one fifth light source comprises a single light source that is common to both the eyes and is arranged at the central portion. In such a case, a configuration of a half mirror and multiple mirrors can be used to direct the at least one fifth image to both the eyes. Alternatively, optionally, the at least one fifth light source comprises at least two light sources that are arranged at the central portion, wherein each of the at least two light sources display images for each of the two eyes.

Such simultaneous display of the aforesaid images creates a real and immersive user experience without affecting the perceived image quality. When further combined with an audio input, such simultaneous display creates an effective and wholesome audio-video effect associated with the displayed environment.

In another embodiment, the at least one processor or the at least one external processor is communicably coupled to a primary display apparatus being viewed by the user or an image source of the primary display apparatus. In this regard, the at least one processor or the at least one external processor is configured to:

receive, from the primary display apparatus or the image source, at least a peripheral portion of at least one image being displayed at the primary display apparatus; and generate the at least two images based on the peripheral portion of the at least one image.

In this regard, optionally, the at least one processor or the at least one external processor is configured to employ the peripheral portion (namely, border areas) of the at least one image for generating the images for the peripheral portions of the field of view.

Optionally, the at least one image is received at the primary display apparatus in a compressed form. Beneficially, the compressed form reduces an associated network bandwidth required for data transfer. Notably, the at least two images corresponding to the peripheral portion of the field of view do not require high resolution.

It will be appreciated that the human vision is capable of noticing flickers in the periphery. As an example, the at least two images may be rendered at the at least two light sources with a refresh rate that lies in a range of 90 to 120 Hertz. The refresh rate of the at least two light sources may be beneficially higher than a refresh rate of the primary display apparatus. It will be appreciated that the at least two light sources could have a refresh rate as high as 200 Hertz (or even more). Moreover, optionally, the at least two images are rendered on the at least two light sources using one or more non-flickering methods known to a person skilled in the art. In an example, higher refresh rates result in a better experience of viewing a tiger jumping from one point to another by reducing a reaction to image noise.

The term "primary display apparatus" as used herein refers to a separate display apparatus for displaying images thereon. Examples of the primary display apparatus include, but do not limit to, a television, a smart phone, a tablet computer, a laptop computer, a desktop, a head-mounted display and a gaming console. Optionally, the primary display apparatus displays an XR environment. The primary display apparatus is provided with the images to be displayed by the image source, for example, such as a streaming multimedia server, a streaming host or the like. Optionally, the image source is implemented as a computing device or a server executing a rendering application that generates and sends images to the primary display apparatus. Alternatively, the image source is implemented as a cloud server that sends pre-stored images to the primary display apparatus or renders the images in real time.

It will be appreciated that in the present embodiment, the primary display apparatus is supplemented with the peripheral display apparatus for an immersive user experience. When further combined with an audio input, the primary display apparatus and the peripheral display apparatus provide an effective and wholesome audio-video effect associated with the displayed environment.

In implementations where the primary display apparatus is an HMD, the at least two cameras could be mounted on the HMD. In implementations where the primary display apparatus is a big screen, such as a television, the at least two cameras could be mounted on the peripheral display apparatus.

Optionally, the peripheral display apparatus further comprises gaze-tracking means. The term "gaze-tracking means" refers to specialized equipment for tracking a gaze direction of the user. Notably, the gaze direction of the user is detected when the peripheral display apparatus in operation is worn by the user. The gaze-tracking means detects and/or follows gaze of the user. The gaze-tracking means may or may not be placed in contact with the eyes. Examples of the gaze-tracking means include contact lenses with motion sensors, cameras monitoring position of pupil of the eye, and so forth. Beneficially, the peripheral display apparatus uses the gaze-tracking means via non-invasive techniques. Beneficially, the gaze-tracking means is arranged (in the peripheral display apparatus) in a manner that it does not cause any obstruction in the user's view.

Optionally, the at least one processor or the at least one external processor is configured to:

process gaze-tracking data, collected by the gaze-tracking means, to determine gaze directions of a first eye and a second eye of the user;

determine, based on the gaze directions, relative positions and orientations of the first eye and the second eye with respect to the first light source and the second light source, respectively; and generate the first image and the second image based on the relative positions and orientations of the first eye and the second eye.

For an object present in a given peripheral portion of the field of view, a position of a chief ray associated with the object approaching towards the user's eye changes as the eye rotates. In other words, this affects a pixel of a given light source with which an object-to-eye ray intersects. Thus, generating a given image (the first image or the second image) based on the relative positions and orientations of the user's eye ensures that an undistorted image is presented to the user.

The present disclosure also relates to the peripheral display system as described above. Various embodiments and variants disclosed above, with respect to the aforementioned first aspect, apply mutatis mutandis to the system.

Optionally, the peripheral display system further comprises at least two cameras comprising a first camera and a second camera arranged to capture a first input image and a second input image of a first region and a second region of a real-world environment in which the user is present, respectively, wherein the at least one processor or the at least one external processor is configured to generate the first image and the second image based on the first input image and the second input image, respectively.

DETAILED DESCRIPTION OF THE DRAWINGS

Figure 1B:
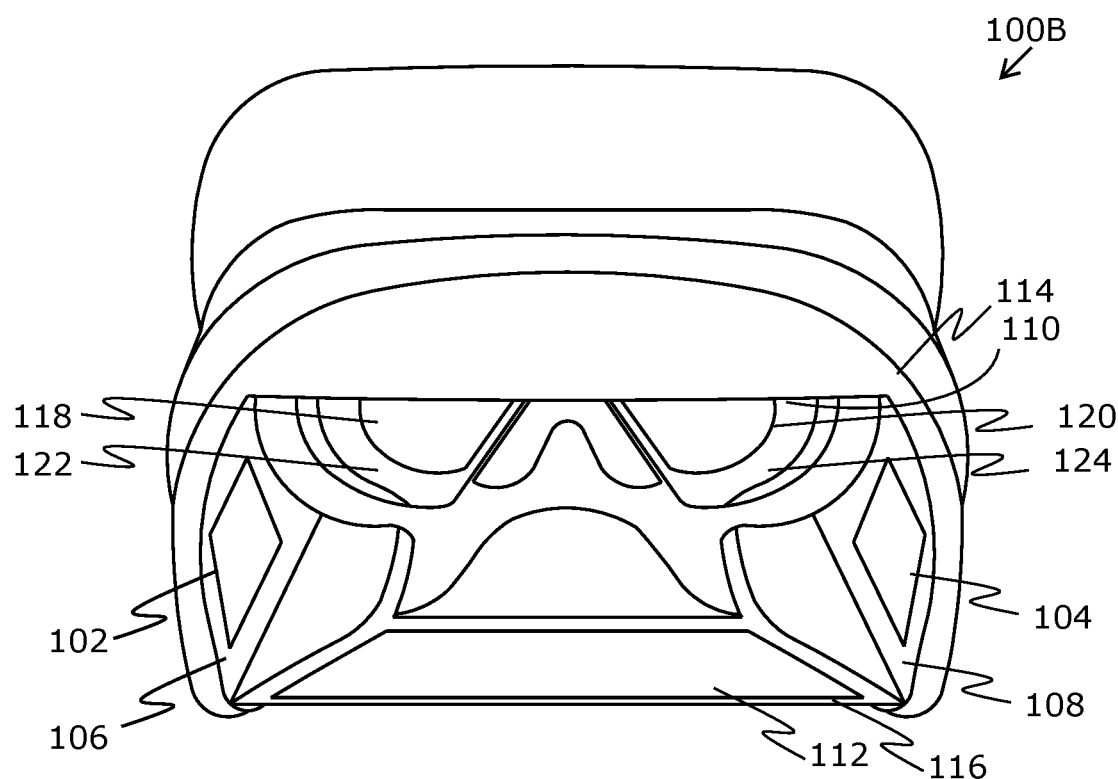
Figure 1C:
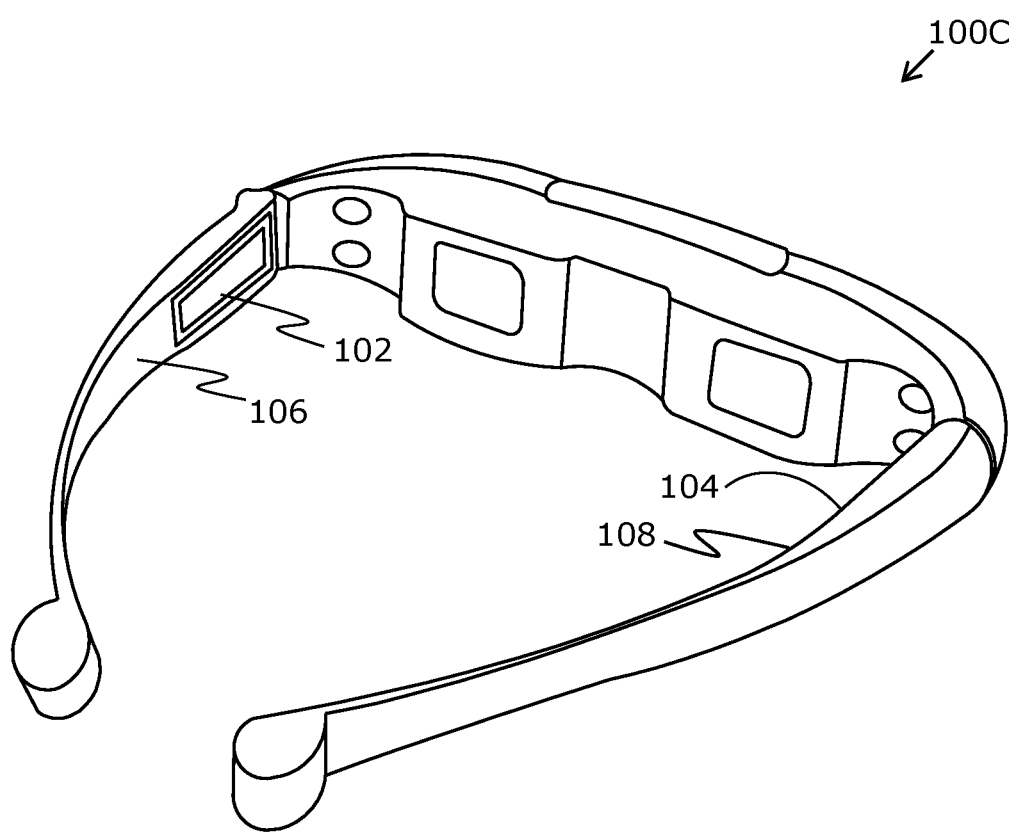

Referring to FIGS. 1A, 1B and 1C, illustrated are schematic illustration of peripheral display apparatuses 100A, 1008 and 100C, in accordance with various embodiments of the present disclosure. As shown, the peripheral display apparatuses 100A and 1008 of FIG. 1A and FIG. 1B respectively are implemented as a head-mounted device, and the peripheral display apparatus 100C of FIG. 1C is implemented as a pair of eyeglasses.

As shown in FIGS. 1A, 1B and 1C, each of the peripheral display apparatuses 100A, 1008 and 100C comprise at least two light sources comprising a first light source 102 and a second light source 104 arranged at a first peripheral portion 106 and a second peripheral portion 108 of a field of view of the user, respectively. The first peripheral portion 106 and the second peripheral portion 108 being positioned at opposite horizontal ends of the field of view. Moreover, each of the peripheral display apparatuses 100A, 1008 and 100C comprise at least one processor (not shown) coupled to the first light source 102 and the second light source 104, wherein the at least one processor or at least one external processor communicably coupled to the at least one processor is configured to generate at least two images comprising a first image and a second image, wherein the at least one processor is configured to display the first image and the second image simultaneously at the first light source 102 and the second light source 104, respectively.

Moreover, as shown in FIG. 1B, the at least two light sources further comprise at least one third light source 110 and at least one fourth light source 112 arranged at a third peripheral portion 114 and a fourth peripheral portion 116 of the field of view of the user, respectively, the third peripheral portion 114 and the fourth peripheral portion 116 being positioned at opposite vertical ends of the field of view. Furthermore, the at least two light sources further comprise at least one fifth light source, such as light sources 118 and 120, arranged at a central portion, such as 122 and 124, of the field of view of the user.

Figure 2A:
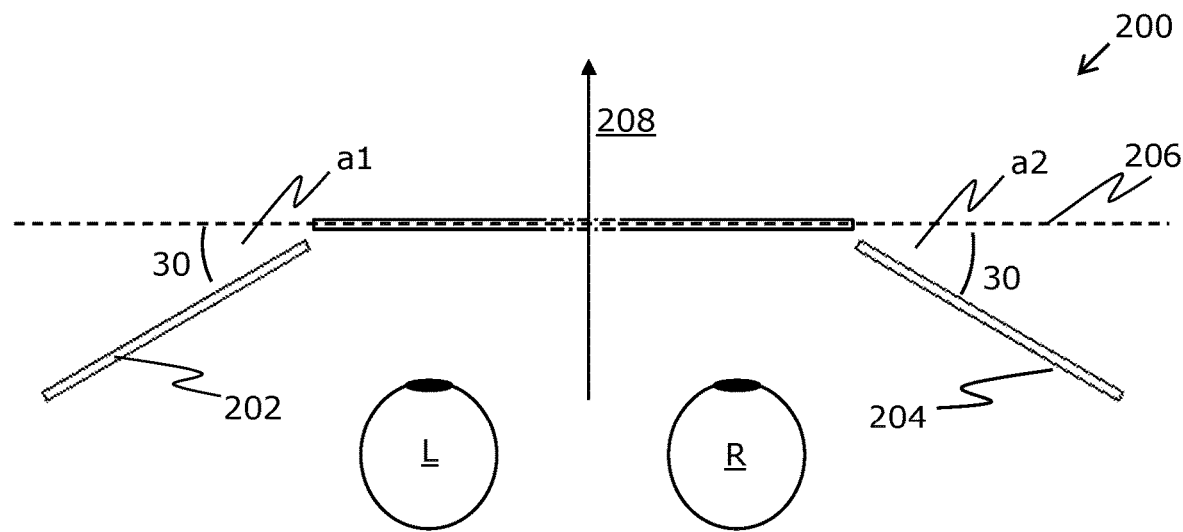
FIGS. 2A, 2B and 2C are line diagrams of arrangement of at least two light sources with respect to a plane, in accordance with various embodiments of the present disclosure.
Figure 2B:
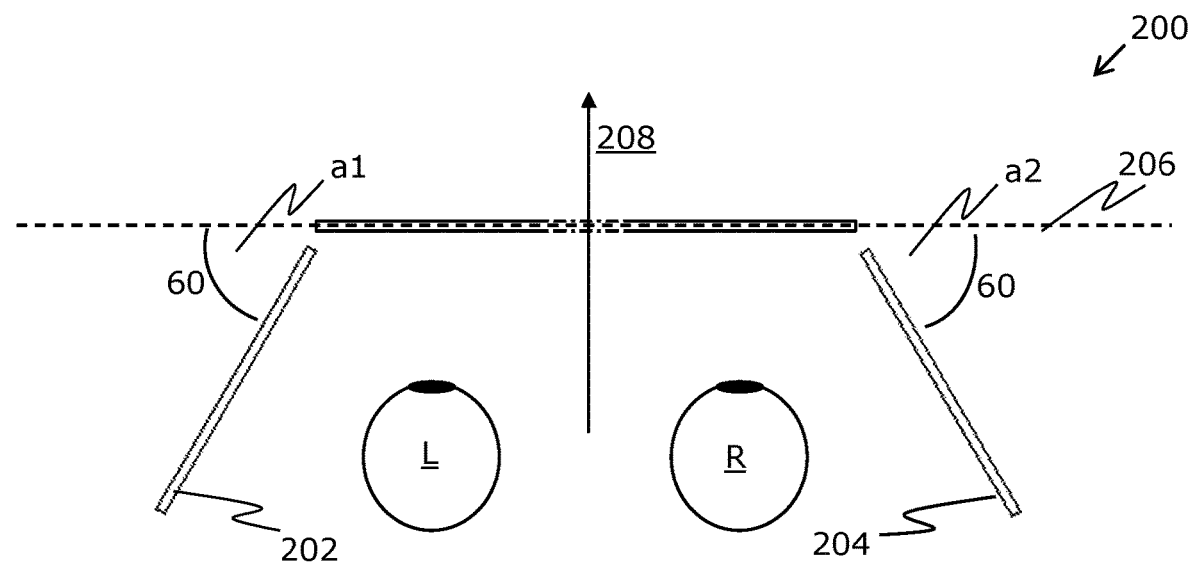
Figure 2C:
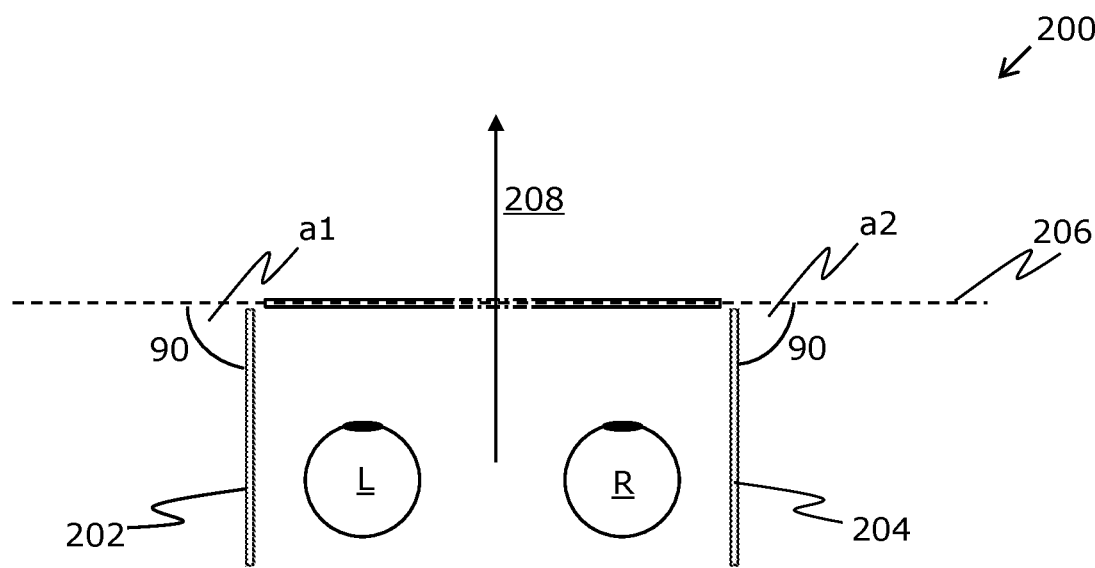

Referring to FIGS. 2A, 2B and 2C, illustrated are line diagrams of an arrangement of at least two light sources, such as 202 and 204, with respect to a plane 206, in accordance with various embodiments of the present disclosure. Shown are top views of a peripheral display apparatus 200 comprising the at least two light sources. As shown, the first light source 202 and the second light source 204 are arranged symmetrically, wherein the first light source 202 and the second light source 204 are positioned at a first angle a1 and a second angle a2 with respect to the plane 206 that is perpendicular to a forward line of vision 208 of the user. As shown in FIG. 2A, each of the first angle a1 and the second angle a2 is of 30 degrees. As shown in FIG. 2B, each of the first angle a1 and the second angle a2 is of 60 degrees. As shown in FIG. 2C, each of the first angle a1 and the second angle a2 is of 90 degrees.

Figure 3:
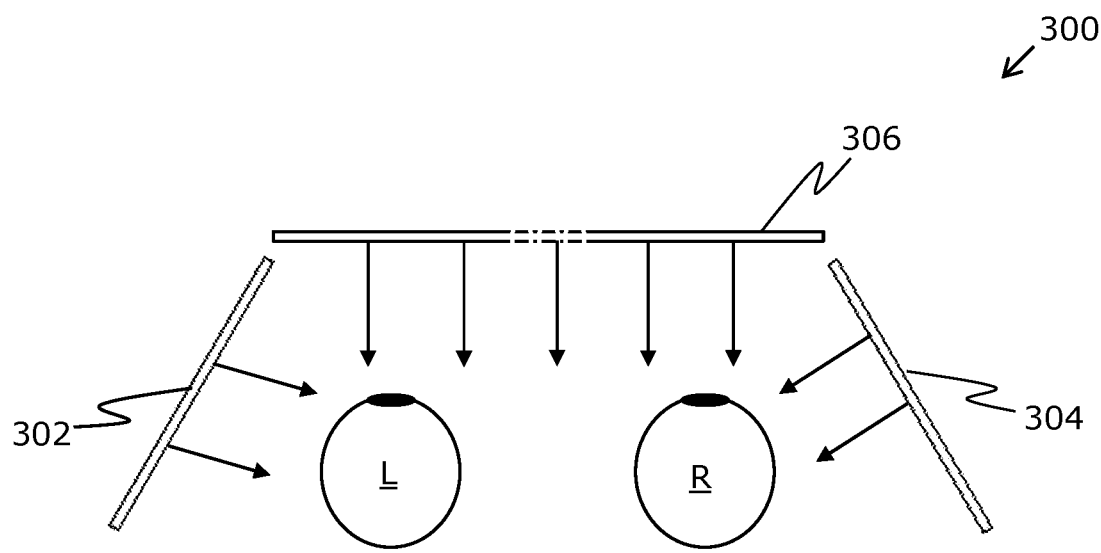
FIG. 3 is a top view of a peripheral display apparatus and light emanating from at least two light sources, in accordance with an embodiment of the present disclosure.

Referring to FIG. 3, illustrated is a top view of a peripheral display apparatus 300 and light emanating from at least two light sources, in accordance with an embodiment of the present disclosure. As shown, at least two light sources, such as a first light source 302 and a second light source 304 and at least one fifth light source 306, are provided in a peripheral portion and a central portion of the field of view of a user, respectively. The arrows from the at least two light sources 302, 304 and 306 show the direction of light emanating therefrom towards eyes of the user.

Figure 4:
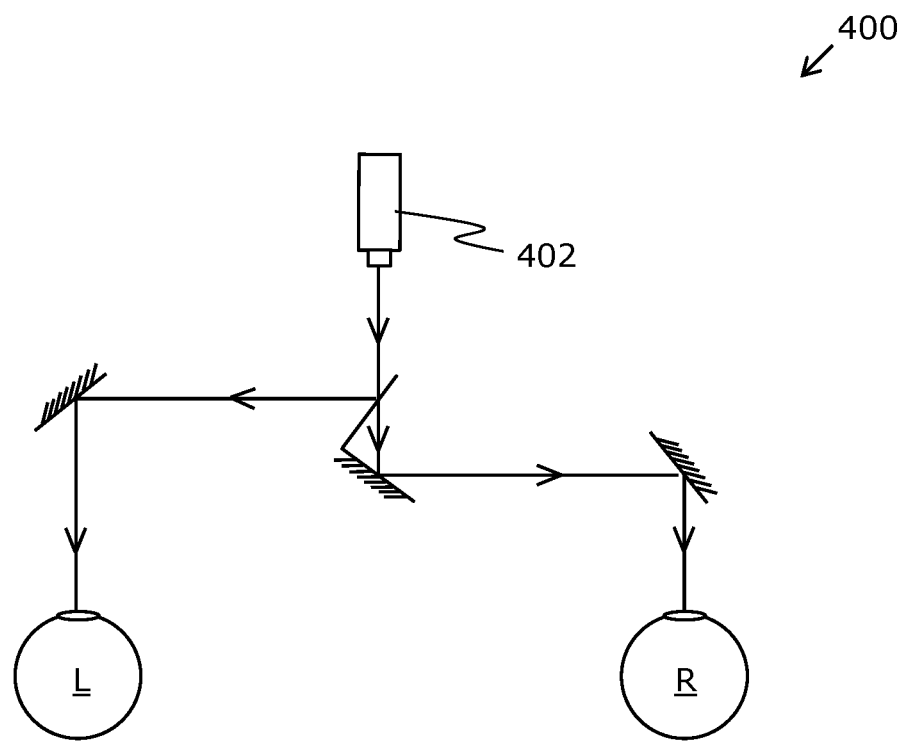
FIG. 4 is a ray diagram of convergence of light from a light source simultaneously on the left and right eyes of a user, in accordance with an embodiment of the present disclosure.

Referring to FIG. 4, illustrated is a ray diagram of convergence of light 400 from a light source 402 simultaneously on the left eye L and right eye R of a user, in an embodiment of the present disclosure. For this purpose, a configuration of a half mirror and multiple full mirrors can be used as shown.

Figure 5:
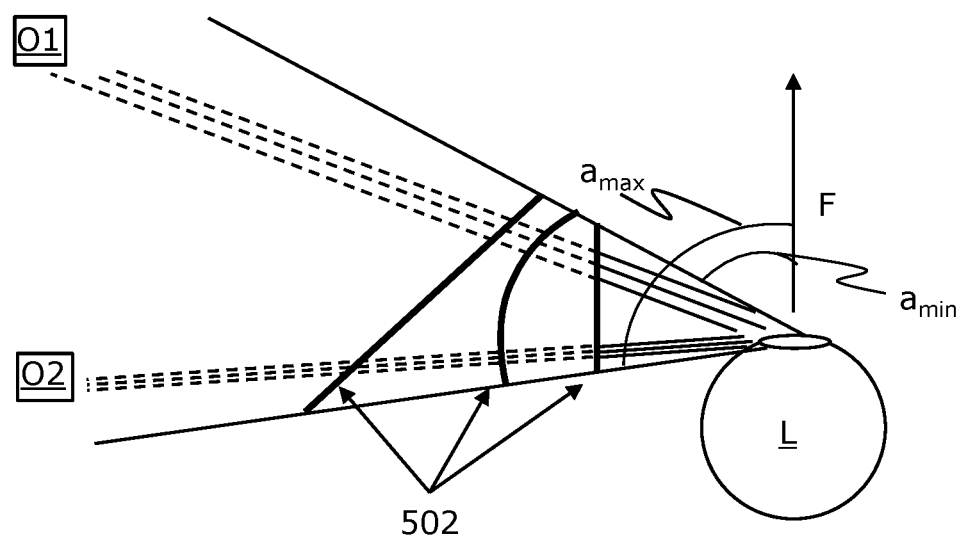
FIG. 5 is a line diagram of angular size of peripheral field of view of a user, in accordance with an embodiment of the present disclosure.

Referring to FIG. 5, illustrated is a line diagram depicting an angular size of a peripheral field of view of a user, in accordance with the present disclosure. As shown, objects O1 and O2 located at peripheral portions of the field of view of the user are shown via light emanating from a light source 502, which hits cornea of the eye L of the user. The peripheral field of view lies between angles $a_{min}$ and $a_{max}$ with respect to a forward line of vision F of the user, as shown. Notably, the angular size of the peripheral field of view lies in a range of an angle that lies in 30-75 degrees up to an angle that lies in 90-130 degrees. It will be appreciated that three different example shapes of the light source 502 have been depicted in FIG. 5; however, there is only one single light source 502 at a given peripheral portion of the field of view.

Figure 6:
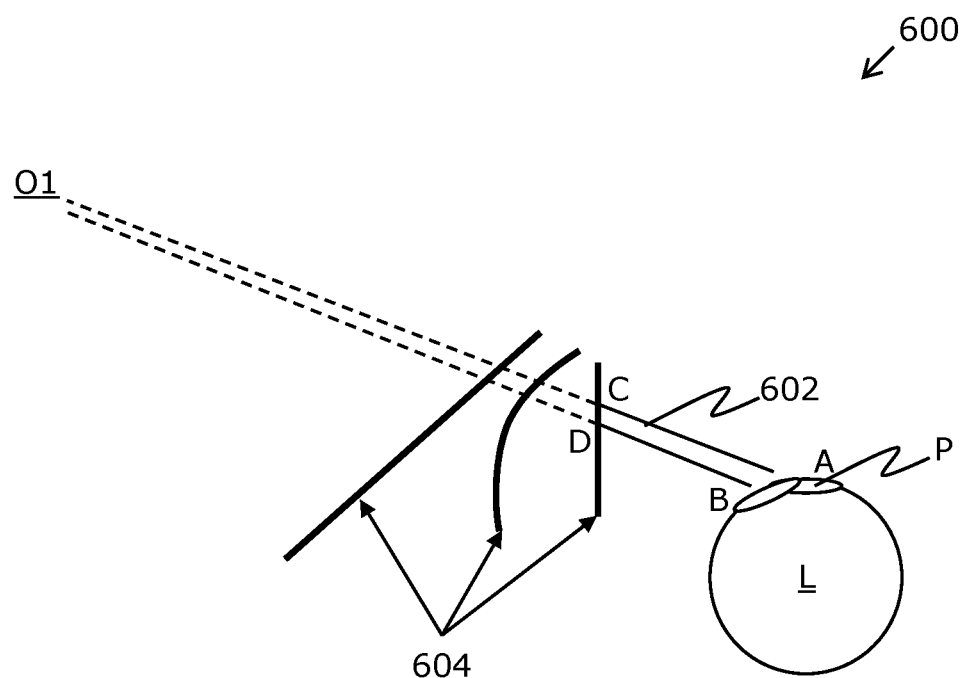
FIG. 6 is a line diagram depicting change in position of a light ray emanating from an object on a light source based on a rotation of pupil of eye of a user, in accordance with an embodiment of the present disclosure.

Referring to FIG. 6, illustrated is a ray diagram 600 depicting a change in a position of a light ray 602 (namely, a chief ray) associated with an object O1 approaching towards a user's eye L and how it affects a pixel of a light source 604 with which an object-to-eye ray intersects, in accordance with an embodiment of the present disclosure. This change happens due to a rotation of pupil P of the eye L. As shown, as the pupil P is rotated left from a point A to B, the position of the light ray 602 emanating from the object O1 is shifted from a point C to D on the light source 604.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A peripheral display apparatus that is wearable by a user, comprising:
   at least two light sources comprising a first light source and a second light source arranged at a first peripheral portion and a second peripheral portion of a field of view of the user, respectively, the first peripheral portion and the second peripheral portion being positioned at opposite horizontal ends of the field of view; and
   at least one processor coupled to the at least two light sources, wherein the at least one processor or at least one external processor communicably coupled to the at least one processor is configured to generate at least two images comprising a first image and a second image, wherein the at least one processor is configured to display the first image and the second image simultaneously at the first light source and the second light source, respectively;
   wherein the at least two light sources further comprise at least one third light source and at least one fourth light source arranged at a third peripheral portion and a fourth peripheral portion of the field of view of the user, respectively, and
   wherein the at least two images further comprise at least one third image and at least one fourth image, and wherein the at least one processor is configured to display the at least one third image and the at least one fourth image at the at least one third light source and the at least one fourth light source, respectively, simultaneously with the display of the first image and the second image at the first light source and the second light source.

2. The peripheral display apparatus of claim 1, wherein the first light source and the second light source are positioned at a first angle and a second angle with respect to a plane that is perpendicular to a forward line of vision of the user, and wherein the first angle and the second angle lie in a range of 30-100 degrees.

3. The peripheral display apparatus of claim 1, wherein a central portion of the field of view of the user spans between 0 degrees and an angle that lies in a range of 30-75 degrees with respect to a forward line of vision of the user, and the first peripheral portion and the second peripheral portion of the field of view span between an angle that lies in a range of 30-75 degrees and an angle that lies in a range of 90-130 degrees with respect to the forward line of vision.

4. The peripheral display apparatus of claim 1, wherein the first light source and the second light source are inwardly curved in shape.

5. The peripheral display apparatus of claim 1, wherein the third peripheral portion and the fourth peripheral portion are positioned at opposite vertical ends of the field of view.

6. The peripheral display apparatus of claim 5, wherein the at least one third light source and the at least one fourth light source are positioned at a third angle and a fourth angle with respect to a plane that is perpendicular to a forward line of vision of the user, and wherein the third angle and the fourth angle lie in a range of 30-100 degrees.

7. The peripheral display apparatus of claim 1, wherein the at least two light sources further comprise at least one fifth light source arranged at a central portion of the field of view of the user, the at least two images further comprising at least one fifth image, wherein the at least one processor is configured to display the at least one fifth image at the at least one fifth light source, simultaneously with the display of the first image and the second image at the first light source and the second light source.

8. The peripheral display apparatus of claim 1, wherein the at least one processor or the at least one external processor is communicably coupled to a primary display apparatus being viewed by the user or an image source of the primary display apparatus, and wherein the at least one processor or the at least one external processor is configured to:
   receive, from the primary display apparatus or the image source, at least a peripheral portion of at least one image being displayed at the primary display apparatus; and
   generate the at least two images based on the peripheral portion of the at least one image.

9. The peripheral display apparatus of claim 1, further comprising at least two cameras comprising a first camera and a second camera arranged to capture a first input image and a second input image of a first region and a second region of a real-world environment in which the user is present, respectively, wherein the at least one processor or the at least one external processor is configured to generate the first image and the second image based on the first input image and the second input image, respectively.

10. The peripheral display apparatus of claim 1, further comprising gaze-tracking means, wherein the at least one processor or the at least one external processor is configured to:
    process gaze-tracking data, collected by the gaze-tracking means, to determine gaze directions of a first eye and a second eye of the user;
    determine, based on the gaze directions, relative positions and orientations of the first eye and the second eye with respect to the first light source and the second light source, respectively; and
    generate the first image and the second image based on the relative positions and orientations of the first eye and the second eye.

11. A peripheral display system comprising:
    a primary display apparatus comprising at least one light source that is to be employed to display at least one image at a central portion of a field of view of a user; and
    a peripheral display apparatus that is wearable by the user, comprising:
       at least two light sources comprising a first light source and a second light source arranged at a first peripheral portion and a second peripheral portion of the field of view of the user, respectively, the first peripheral portion and the second peripheral portion being positioned at opposite horizontal ends of the field of view; and
       at least one processor coupled to the at least two light sources, wherein the at least one processor or at least one external processor communicably coupled to the at least one processor is configured to generate at least two images comprising a first image and a second image, wherein the at least one processor is configured to display the first image and the second image simultaneously at the first light source and the second light source, respectively;
       wherein the at least two light sources further comprise at least one third light source and at least one fourth light source arranged at a third peripheral portion and a fourth peripheral portion of the field of view of the user, respectively, the third peripheral portion and the fourth peripheral portion being positioned at opposite vertical ends of the field of view, and wherein the at least two images further comprise at least one third image and at least one fourth image, and wherein the at least one processor is configured to display the at least one third image and the at least one fourth image at the at least one third light source and the at least one fourth light source, respectively, simultaneously with the display of the first image and the second image at the first light source and the second light source.

12. The peripheral display system of claim 11, wherein the first light source and the second light source are positioned at a first angle and a second angle with respect to a plane that is perpendicular to a forward line of vision of the user, and wherein the first angle and the second angle lie in a range of 30-100 degrees.

13. The peripheral display system of claim 11, wherein the central portion of the field of view spans between 0 degrees and an angle that lies in a range of 30-75 degrees with respect to a forward line of vision of the user, and the first peripheral portion and the second peripheral portion of the field of view span between an angle that lies in a range of 30-75 degrees and an angle that lies in a range of 90-130 degrees with respect to the forward line of vision.

14. The peripheral display system of claim 11, wherein the first light source and the second light source are inwardly curved in shape.

15. The peripheral display system of claim 11, wherein the third peripheral portion and the fourth peripheral portion are positioned at opposite vertical ends of the field of view.

16. The peripheral display system of claim 15, wherein the at least one third light source and the at least one fourth light source are positioned at a third angle and a fourth angle with respect to a plane that is perpendicular to a forward line of vision of the user, and wherein the third angle and the fourth angle lie in a range of 30-100 degrees.

17. The peripheral display system of claim 11, wherein the at least one processor or the at least one external processor is communicably coupled to the primary display apparatus or an image source of the primary display apparatus, and wherein the at least one processor or the at least one external processor is configured to:
receive, from the primary display apparatus or the image source, at least a peripheral portion of the at least one image; and
generate the at least two images based on the peripheral portion of the at least one image.

18. The peripheral display system of claim 11, further comprising at least two cameras comprising a first camera and a second camera arranged to capture a first input image and a second input image of a first region and a second region of a real-world environment in which the user is present, respectively, wherein the at least one processor or the at least one external processor is configured to generate the first image and the second image based on the first input image and the second input image, respectively.

19. The peripheral display system of claim 11, wherein the peripheral display apparatus further comprises gaze-tracking means, wherein the at least one processor or the at least one external processor is configured to:
process gaze-tracking data, collected by the gaze-tracking means, to determine gaze directions of a first eye and a second eye of the user;
determine, based on the gaze directions, relative positions and orientations of the first eye and the second eye with respect to the first light source and the second light source, respectively; and
generate the first image and the second image based on the relative positions and orientations of the first eye and the second eye.

* * * * *